Nov. 14, 1950     I. L. YOUNG     2,529,858
HOIST CHAIN EQUIPMENT
Filed Dec. 27, 1945
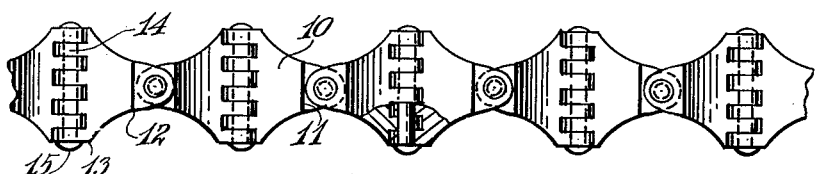
FIG. 1
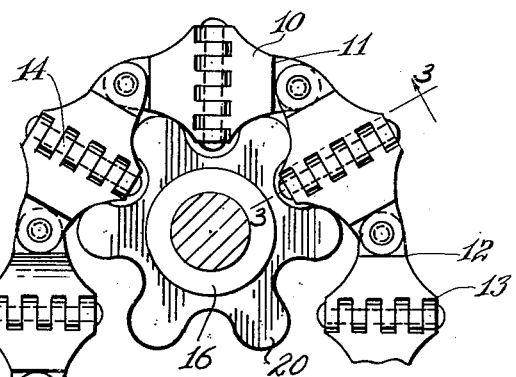
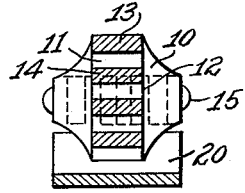
FIG. 3
FIG. 2
*INVENTOR.*
IRVIN L. YOUNG
BY *Stevens & Batchelor*
ATT'YS Patented Nov. 14, 1950

2,529,858

UNITED STATES PATENT OFFICE 2,529,858

HOIST CHAIN EQUIPMENT

Irvin L. Young, Chicago, Ill.

Application December 27, 1945, Serial No. 637,340

7 Claims. (Cl. 74—246)

My invention relates to hoist chain drives, and more particularly to chains whose links are formed with universal joints. I have found that such chains, while capable of lateral flexing, are unsuited for use as hoist chains, where the chain is subject to twisting strains from the turning of the load or the wrapping of the chain to tie the same. It is therefore one object of the present invention to provide a chain which is so flexible that it suffers no strains from the turning or the tying of the load.

A further object is to provide a chain of the above type whose links are constituted to gather closely on a curve and thus enable a sprocket of small diameter to be used.

A still further object is to construct the chain in a manner to receive the sprocket teeth between the links, rather than within the same.

Another object is to design the chain to secure ample universal flexibility with the use of a minimum number of links.

An additional object is to include a multiple-bearing pivoting joint between the links for maximum strength.

A further object is to design the links of the chain in a manner to prevent the chain from kinking.

Another object is to design a chain drive wherein the hoisting sprocket exerts a rotary rather than radial pressure for the efficient driving of the chain.

An important object is to design the links of the chain in one piece and with a block formation to render them strong and rigid.

With the above objects in view and any others which may suggest themselves from the description to follow, a better understanding of the invention may be had by reference to the accompanying drawing, in which—

Fig. 1 is an elevation of a section of the chain, with one pair of links partly in section;

Fig. 2 is an illustration showing the application of the chain; and

Fig. 3 is a section on the line 3—3 of Fig. 2.

Usually, chains of the universal type follow basic lines wherein the links are composed of pairs of side bars horizontally pivoted to interconnecting blocks, these being made up of vertically pivoted components. The use of such a chain for hoisting purposes imposes a twisting strain tending to distort or bend the link bars, as well as to loosen them from the pivoting pins. Besides, the conventional link structure does not lend itself to close wrapping about the load or the hoisting sprocket.

In departing from the above practice, specific reference to the drawing indicates each link of the improved chain as a block 10 of square cross-section. The end-faces 11 of each block are oblong and at right-angles to each other; and the side faces of the block taper in width as they extend from the side edges 12 of each end-face to the terminal edges 13 of the other end-face. Also, such side faces have a concavity between the edges 12 and 13.

The end faces 11 of each link project with a series of spaced ears 14, these extending longitudinally and being bored in registration. The ears 14 of adjoining links combine in alternation to make a pivot joint therebetween with the aid of a pintle pin 15.

Fig. 2 shows the application of the chain over a hoisting sprocket 16 and down to a load represented by a bar 17. The chain is shown wrapped once around the load, although two or three wrappings may be required in some cases; the end of the chain carrying the usual hook 18 which renders the tie secure by being engaged with the pendent portion of the chain.

Fig. 2 also shows that the chain receives the sprocket teeth 20 between, rather than within the links. This feature enables the links to wrap more closely around the hoisting sprocket and therefore fit one of small size. This factor lends the hoisting mechanism a more favorable lifting ratio. Also, it is noted that the teeth of the sprocket are ball-shaped to fit and impinge on the hollows of the chain links with a lateral, rotary pressure. The chain is thus drawn around the sprocket rather than lifted from the same, improving the lifting efficiency of the hoist and confining the stress on the chain to its normal or traveling direction.

The taper of the chain links lends them additional closing or nesting leeway, to the end that they pivot into twisted form in case the load turns or when the chain is wrapped in a deviating course around the load, as seen in Fig. 2. Further, the chain can withstand heavy loads, because the construction of each link in block form makes it massive and strong. Further, the use of a multiple-ear pivot joint between the links lends the pintle pin 15 a long bearing and minimizes shearing strains, so that the pivoting zone of the links extends over a wide area and its pull is distributed along the same. Further, the links of the chain are in one piece, making the chain exceeding simple and concentrating the pull on each link in a single, main part instead of an assembly of joined and more delicate parts. Finally, the closing of the chain links is limited to a point short of folding, so that no kinking of the chain is possible. A hoisting chain drive is thus had which is durable and highly efficient.

While I have described the invention along specific lines, various minor changes or refinements may be made therein without departing from its principle, and I desire to consider such changes and refinements as coming within the scope and spirit of the appended claims.

I claim:

1. A chain drive comprising a sprocket, and a chain for the same, the chain links presenting terminal concavities in the zones of sprocket-tooth application, and the sprocket teeth being extended in the direction of such concavities to be pocketed by the latter and impart rotary driving pressure to the chain, each pivoting zone being formed by multiple series of alternating ears receiving a common pintle pin.

2. A chain drive comprising a sprocket, and a chain for the same, the chain links presenting terminal concavities in the zones of sprocket-tooth application, and the sprocket teeth being extended in the direction of such concavities to be pocketed by the latter and impart rotary driving pressure to the chain, each pivoting zone being formed by widened adjoining link portions with multiple series of alternating ears receiving a common pintle pin.

3. A chain drive comprising a sprocket, and a chain for the same, the chain links presenting terminal concavities in the zones of sprocket-tooth application, and the sprocket teeth being extended in the direction of such concavities to be pocketed by the latter and impart rotary driving pressure to the chain, the end faces of each link being oblong and at right-angles to each other.

4. A chain drive comprising a sprocket, and a chain for the same, the chain links presenting terminal concavities in the zones of sprocket-tooth application, and the sprocket teeth being extended in the direction of such concavities to be pocketed by the latter and impart rotary driving pressure to the chain, the end faces of each link being oblong and at right-angles to each other, and the side faces of each link tapering in width as they extend from the side edges of each end-face to the terminal edges of the other end-face.

5. A chain drive comprising a sprocket, and a chain for the same, said chain being formed of links having ends pivotally connected by pins and having opposite side faces concaved longitudinally of the links and cooperating with corresponding side faces of adjoining links to form terminal concavities in the zones of sprocket tooth application, the sprocket teeth being radially of the sprocket in the direction of said concavities and having circumferentially arcuate end portions to be pocketed in the concavities and impart driving pressure to the chain.

6. In a chain, a series of block-type links, each link having one end pivoted in one plane to the next link and having its other end pivoted to the adjoining link at right angles to the plane in which the first end of the link moves, side faces of the links being concaved and curved longitudinally for the full length of the links.

7. A sprocket chain comprising a plurality of links, each link having a solid body formed at opposite ends with series of ears in interfitting engagement with ears at the adjacent ends of adjoining links, pins passing through the ears and pivotally connecting the links with each other, the pivotal connection for one end of each link being at right angles to the pivotal connection for its other end, each link having opposite side faces of substantially triangular shape and tapered from opposite sides of the series of ears at one end of the link to opposite ends of the series of ears at the opposite end of the link, and the said side faces being curved longitudinally to provide adjoining links with concaved surfaces cooperating with each other and forming curved walls of recesses for receiving teeth of a sprocket wheel when the links are tilted to swing the said companion side faces towards each other.

IRVIN L. YOUNG.

REFERENCES CITED

The following references are of record in the file of this patent:

UNITED STATES PATENTS

| Number | Name | Date |
|---|---|---|
| 145,447 | Reigart | Dec. 9, 1873 |
| 566,095 | Reenstierna | Aug. 18, 1896 |
| 594,416 | McCormick | Nov. 30, 1897 |

FOREIGN PATENTS

| Number | Country | Date |
|---|---|---|
| 89,869 | Germany | Dec. 17, 1896 |